United States Patent
Nagai et al.

(10) Patent No.: US 11,543,022 B2
(45) Date of Patent: Jan. 3, 2023

(54) VEHICULAR CONTROL DEVICE

(71) Applicant: TOYOTA JIDOSHA KABUSHIKI KAISHA, Toyota (JP)

(72) Inventors: Kengo Nagai, Toyota (JP); Naoto Moriya, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 17/665,028

(22) Filed: Feb. 4, 2022

(65) Prior Publication Data
US 2022/0282787 A1 Sep. 8, 2022

(30) Foreign Application Priority Data
Mar. 3, 2021 (JP) .............................. JP2021-033763

(51) Int. Cl.
*F16H 59/48* (2006.01)
*F16H 59/68* (2006.01)
*F16H 59/38* (2006.01)

(52) U.S. Cl.
CPC ............. *F16H 59/48* (2013.01); *F16H 59/38* (2013.01); *F16H 59/68* (2013.01); *F16H 2059/385* (2013.01); *F16H 2059/6807* (2013.01)

(58) Field of Classification Search
CPC .......... F16H 59/38; F16H 59/48; F16H 59/68; F16H 2059/385; F16H 2059/6807
See application file for complete search history.

(56) References Cited

U.S. PATENT DOCUMENTS

| | | | | |
|---|---|---|---|---|
| 4,361,060 A | * | 11/1982 | Smyth | B60W 10/06 477/120 |
| 2018/0065638 A1 | * | 3/2018 | Kawahara | B60W 10/184 |
| 2019/0302797 A1 | | 10/2019 | Imamura | |
| 2020/0130688 A1 | * | 4/2020 | Kline | B60W 10/11 |
| 2022/0210621 A1 | * | 6/2022 | Sankaran | G06Q 30/0635 |

FOREIGN PATENT DOCUMENTS

JP 2019172126 A 10/2019

\* cited by examiner

*Primary Examiner* — Edwin A Young
(74) *Attorney, Agent, or Firm* — Dinsmore & Shohl LLP

(57) ABSTRACT

A vehicular control device that is mounted in a vehicle including an automatic gear shift device is configured to store vehicle control state information including a control state of the vehicle in a predetermined gear shift status when a rate of change in acceleration in the predetermined gear shift status at the time of gear shift is greater than a rate of change in acceleration in the predetermined gear shift status in the past. Accordingly, it is possible to store and accumulate vehicle control state information in a predetermined gear shift status with a higher importance out of predetermined gear shift statuses occurring at the time of gear shift.

3 Claims, 2 Drawing Sheets

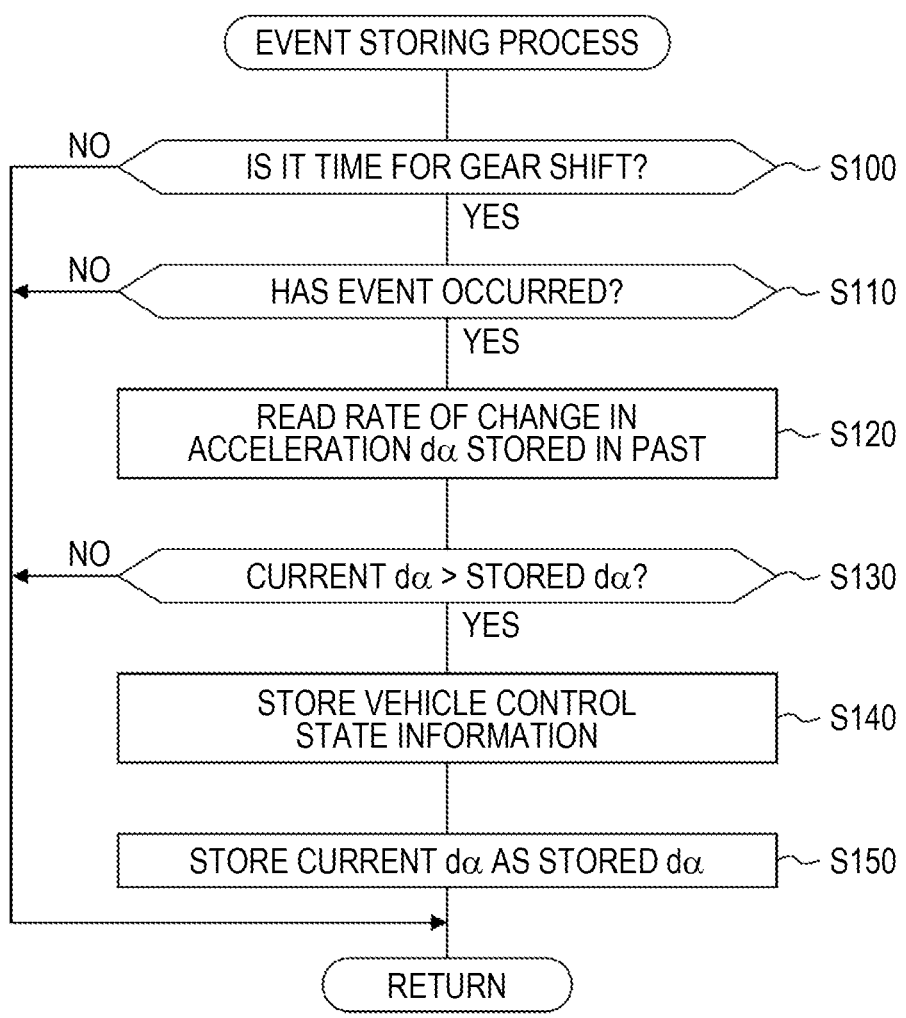

VEHICULAR CONTROL DEVICE

CROSS-REFERENCE TO RELATED APPLICATION

This application claims priority to Japanese Patent Application No. 2021-033763 filed on Mar. 3, 2021, incorporated herein by reference in its entirety.

BACKGROUND

1. Technical Field

The disclosure relates to a vehicular control device and more particularly to a vehicular control device that is mounted in a vehicle including an automatic gear shift device.

2. Description of Related Art

In the related art, as such a type of technique, a technique of receiving vehicle information including information of a current location or information of a net fuel consumption rate or a net power consumption rate from each of vehicles, calculating a drive force reference value based on the information of a net fuel consumption rate or a net power consumption rate in the received vehicle information, calculating an acceleration command value for automated driving based on the drive force reference value, and transmitting the calculated acceleration command value to the corresponding vehicle has been proposed (for example, see Japanese Unexamined Patent Application Publication No. 2019-172126 (JP 2019-172126 A)). With this technique, it is possible to alleviate traffic congestion and to reduce a total amount of consumed fuel of a plurality of vehicles by controlling automated driving of the plurality of vehicles.

SUMMARY

Information of control states of vehicles is used for various types of control and thus a larger amount of information needs to be accumulated. In a vehicle including an automatic gear shift device, since a particular event (gear shift status) is likely to occur at the time of gear shift, it is useful that more information of a control state of a vehicle in an event occurring at the time of gear shift be accumulated. However, when the same event occurs at the time of gear shift in the same vehicle and information of a control state of a vehicle in all events is accumulated, information in an event with a higher importance may be buried in information of many events with a lower importance.

The disclosure provides a vehicular control device that can accumulate information of a vehicle control state in an event with a higher importance out of events occurring at the time of gear shift.

A vehicular control device according to the disclosure employs the following configurations to achieve the aforementioned objective.

According to an aspect of the disclosure, there is provided a vehicular control device that is mounted in a vehicle including an automatic gear shift device, wherein the vehicular control device is configured to store vehicle control state information including a control state of the vehicle in a predetermined gear shift status when a rate of change in acceleration in the predetermined gear shift status at the time of gear shift is greater than a rate of change in acceleration in the predetermined gear shift status in the past.

With the vehicular control device according to the disclosure, when the rate of change in acceleration in the predetermined gear shift status at the time of gear shift is greater than a rate of change in acceleration in the predetermined gear shift status in the past, vehicle control state information including the control state of the vehicle in the predetermined gear shift status is stored. Since a higher rate of change in acceleration can be determined to be a gear shift status (event) with a higher importance, it is possible to store vehicle control state information in an event (gear shift status) with a higher importance out of events (gear shift statuses) occurring at the time of gear shift. In the vehicular control device, the vehicular control device may be configured to transmit the vehicle control state information to an external server at a predetermined timing after the vehicle control state information has been stored. With this configuration, it is possible to accumulate vehicle control state information in an event with a higher importance in the external server.

Here, the predetermined gear shift status may include one of a status in which the rate of change in acceleration is equal to or greater than a predetermined rate of change, a status in which a turbine rotation speed of a torque converter is equal to or greater than a predetermined rotation speed, and a status in which a time required for gear shift is equal to or greater than a predetermined time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating an example of an event storing process that is performed by an ECU 50.

DETAILED DESCRIPTION OF EMBODIMENTS

Figure 1:
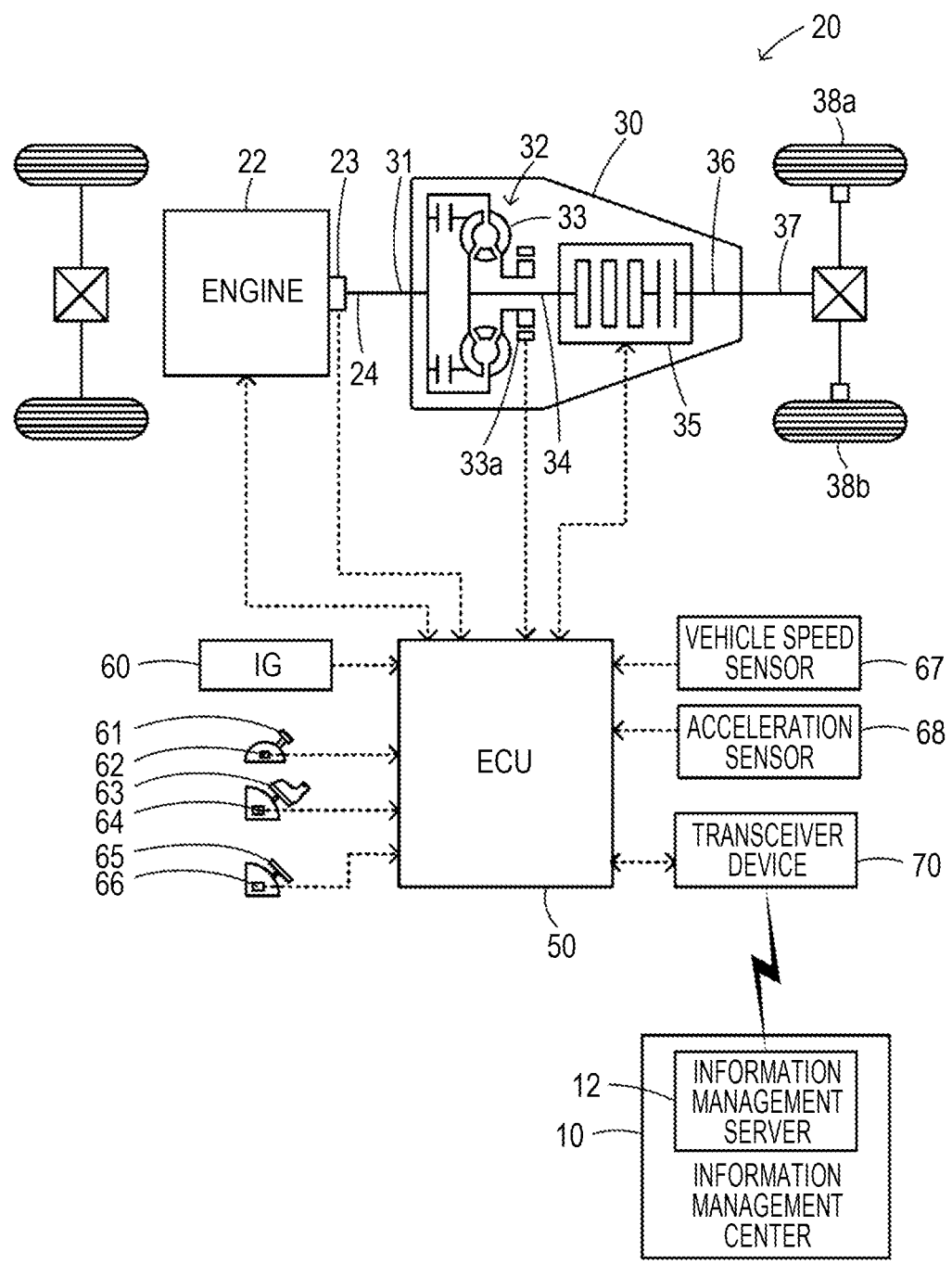
FIG. 1 is a diagram schematically illustrating a configuration of a vehicle 20 in which a vehicular control device according to an embodiment of the disclosure is mounted.

Hereinafter, an embodiment of the disclosure will be described with reference to the accompanying drawings.

FIG. 1 is a diagram schematically illustrating a configuration of a vehicle 20 in which a vehicular control device according to an embodiment of the disclosure is mounted. As illustrated in the drawing, the vehicle 20 according to this embodiment includes an engine 22, an automatic gear shift device 30, an electronic control unit (hereinafter referred to as an "ECU") 50, and a transceiver device 70.

The engine 22 is configured as a multi-cylinder (such as four-cylinder or six-cylinder) internal combustion engine that outputs power through intake, compression, expansion (explosive combustion), and exhaust strokes using gasoline, diesel, or the like supplied via a fuel supply system from a fuel tank as fuel. Operation of the engine 22 is controlled by the ECU 50.

The automatic gear shift device 30 includes a torque converter 32 with a lockup clutch, an automatic transmission 35 with six gear stages, and a hydraulic circuit which is not illustrated. The torque converter 32 is configured as a general hydraulic gear and amplifies and transmits a torque of an input shaft 31 connected to a crankshaft 24 of the engine 22 to an intermediate rotation shaft 34 which is an input shaft of the automatic transmission 35 or transmits the torque without amplifying the torque. The automatic transmission 35 is connected to the intermediate rotation shaft 34 and an output shaft 36 connected to a drive shaft 37 and includes a plurality of planetary gears and a plurality of frictional engagement elements (such as clutches and brakes) which is hydraulically driven. The drive shaft 37 is connected to driving wheels 38a and 38b via an axle and a rear differential gear. The automatic transmission 35 forms one of first to sixth forward gear stages or a reverse gear stage, for example, by engagement and disengagement of the plurality of frictional engagement elements and transmits power between the intermediate rotation shaft 34 and the output shaft 36.

Although not illustrated, the ECU 50 is configured as a microprocessor including a CPU as a major component and includes a ROM that stores processing programs, a RAM that temporarily stores data, a flash memory, input and output ports, and a communication port in addition to the CPU.

Signals from various sensors required for controlling the operation of the engine 22, signals from various sensors required for controlling driving of the automatic gear shift device 30, or the like are input to the ECU 50 via the input port. Examples of the signals input to the ECU 50 include signals from sensors that detect an operation state of the engine 22 such as a crank angle θcr from a crank position sensor 23 that detects a rotational position of the crankshaft 24 of the engine 22 and a coolant temperature Tw from a coolant temperature sensor (not illustrated) that detects a temperature of a coolant of the engine 22. The examples also include signals from sensors that detect an operation state of the automatic gear shift device 30 such as a turbine rotation speed NT from a rotation speed sensor 33a that detects a rotation speed of a turbine runner 33 of the torque converter 32 or an oil temperature from a temperature sensor which is not illustrated. The examples also include an ignition signal from an ignition switch 60, a shift position SP from a shift position sensor 62 that detects a shift position of a shift lever 61, an accelerator operation amount Acc from an accelerator pedal position sensor 64 that detects an amount of depression of an accelerator pedal 63, and a brake pedal position BP from a brake pedal position sensor 66 that detects an amount of depression of a brake pedal 65. The examples also include a vehicle speed V from a vehicle speed sensor 67 and an acceleration α from an acceleration sensor 68.

Various control signals for controlling the operation of the engine 22 or various control signals for controlling the operation of the automatic gear shift device 30 are output from the ECU 50 via the output port. Examples of the various control signals include control signals required for controlling the operation of the engine 22 such as a control signal for a throttle motor (not illustrated) that drives a throttle valve, a control signal for a fuel injection valve, and a control signal for an ignition plug. The examples also include a control signal for the lockup clutch of the torque converter 32 and a control signal for a hydraulic circuit (not illustrated) of the automatic transmission 35.

The ECU 50 periodically transmits and receives information to and from an information management server 12 provided in an external information management center 10 via the transceiver device 70 at predetermined timings.

The operation of the vehicle 20 according to this embodiment having the aforementioned configuration, particularly, the operation when an event occurs at the time of gear shift, will be described below. Here, one of a status in which a rate of change dα of an acceleration α is equal to or greater than a predetermined rate of change, a status in which a turbine rotation speed NT of the torque converter 32 is equal to or greater than a predetermined rotation speed, and a status in which a time required for gear shift is equal to or greater than a predetermined time is supposed as an event at the time of gear shift. FIG. 2 is a flowchart illustrating an example of an event storing process that is performed by the ECU 50. This process is repeatedly performed.

When the event storing process is performed, the ECU 50 determines whether it is a time of gear shift (Step S100). Whether it is a time of gear shift can be determined by inspecting whether a current status is a half-way status until gear shift is completed after a change instruction of a gear stage (a gear shift instruction) for the automatic transmission 35 has been issued. When it is determined that it is not time for gear shift, it is determined that this process is not applicable, and this process ends.

When it is determined in Step S100 that it is time for gear shift, it is determined whether an event has occurred (Step S110). As described above, since one of a status in which the rate of change dα of the acceleration α is equal to or greater than a predetermined rate of change, a status in which a turbine rotation speed NT of the torque converter 32 is equal to or greater than a predetermined rotation speed, and a status in which a time required for gear shift is equal to or greater than a predetermined time is supposed as the event at the time of gear shift, it is determined whether one thereof has been selected. Here, an acceleration in case of an acceleration or an acceleration in case of a deceleration which is not normally generated at the time of gear shift is used as the predetermined rate of change. A turbine rotation speed which is higher than a turbine rotation speed supposed at the time of gear shift is used as the predetermined rotation speed. A time in which gear shift ends and which is counted by a backup timer, that is, a time that is used to end the gear shift by forcibly engaging a clutch after the time has elapsed, is used as the predetermined time. When it is determined that an event has not occurred, this process ends.

When it is determined in Step S110 that an event has occurred, the rate of change dα of the acceleration α stored in the event occurring in the past (a stored rate of change dα) is read (Step S120), and it is determined whether a rate of change dα of the acceleration α occurring currently (a current rate of change dα) is greater than the stored rate of change dα (Step S130). When the current rate of change dα is equal to or less than the stored rate of change dα, it is determined that an importance of the current event is not higher than that of the event in the past, and this process ends.

When it is determined in Step S130 that the current rate of change dα is greater than the stored rate of change dα, it is determined that the importance of the current event is higher than that of the event in the past, vehicle control state information when the event has occurred is stored (Step S140), the current rate of change dα is stored as the stored rate of change dα (Step S150), and this process ends. The vehicle control state information includes information such as a control state of the automatic gear shift device 30, a control state of the engine 22, or a travel state of the vehicle such as a turbine rotation speed, a rotation speed of the output shaft, a vehicle speed, an oil temperature, a throttle opening level, an acceleration, a rate of change in acceleration, a shift position, a target gear stage, hydraulic pressures of the constituents of the hydraulic circuits, a required engine torque, or an actual output torque. The vehicle control state information is stored in a predetermined storage area of the flash memory of the ECU 50 and is periodically transmitted to the information management server 12 of the information management center 10 at predetermined timings. The information management server 12 having received the vehicle control state information accumulates the vehicle control state information.

When an event occurs at the time of gear shift, the ECU 50 mounted in the vehicle 20 according to the embodiment determines whether the rate of change dα of the acceleration α in the current event (the current rate of change dα) is greater than the rate of change dα of the acceleration α stored in the event occurring in the past (the stored rate of change dα). When it is determined that the current rate of change dα is greater than the stored rate of change dα, the vehicle control state information is stored and the current rate of change dα is stored as a stored rate of change dα. Accordingly, it is possible to store the vehicle control state information and the rate of change dα of the acceleration α in an event with a higher importance. Since the stored vehicle control state information is periodically transmitted to the information management server 12 at predetermined timings and accumulated by the information management server 12, it is possible to accumulate the vehicle control state information in an event with a higher importance. As a result, it is possible to accumulate vehicle control state information in an event with a higher importance out of events occurring at the time of gear shift.

The ECU 50 mounted in the vehicle 20 according to the embodiment stores the vehicle control state information in an event when it is determined that the current rate of change dα is greater than the stored rate of change dα, and then transmits the stored vehicle control state information to the external information management server 12 at predetermined timings. However, the vehicle control state information in an event may be transmitted to the external information management server 12 immediately when it is determined the current rate of change dα is greater than the stored rate of change dα.

In the embodiment, the disclosure is applied to the vehicle 20 including the engine 22 and the automatic gear shift device 30, but the disclosure may be applied to a vehicle with any configuration such as a configuration including an electric motor on the input shaft of the automatic gear shift device as long as it is a vehicle including an automatic gear shift device.

Correspondence between principal elements in the embodiment and principal elements described in the SUMMARY will be described below. In the embodiment, the automatic gear shift device 30 corresponds to an "automatic gear shift device," the electronic control unit 50 (ECU 50) corresponds to a "vehicular control device," and an event corresponds to a "predetermined gear shift status."

Since the correspondence between the principal elements in the embodiment and the principal elements described in the SUMMARY is only an example for specifically describing the embodiment of the disclosure described in the SUMMARY, the correspondence does not limit the elements of the disclosure described in the SUMMARY. That is, the disclosure described in the SUMMARY should be construed based on the description therein, and the embodiment is only a specific example of the disclosure described in the SUMMARY.

While an embodiment of the disclosure has been described above with reference to the drawings, the disclosure is not limited to the embodiment and can be modified in various forms without departing from the gist of the disclosure.

The disclosure can be used in the industries of manufacturing vehicular control devices.

What is claimed is:

1. A vehicular control device that is mounted in a vehicle including an automatic gear shift device, wherein:
the vehicular control device is configured to store vehicle control state information including a control state of the vehicle in a predetermined gear shift status when a rate of change in acceleration in the predetermined gear shift status at the time of gear shift is greater than a rate of change in acceleration in the predetermined gear shift status in the past.

2. The vehicular control device according to claim 1, wherein the predetermined gear shift status includes one of a status in which the rate of change in acceleration is equal to or greater than a predetermined rate of change, a status in which a turbine rotation speed of a torque converter is equal to or greater than a predetermined rotation speed, and a status in which a time required for gear shift is equal to or greater than a predetermined time.

3. The vehicular control device according to claim 1, wherein the vehicular control device is configured to transmit the vehicle control state information to an external server at a predetermined timing after the vehicle control state information has been stored.

* * * * *